United States Patent
Ahne (10) Patent No.: US 9,213,927 B1
(45) Date of Patent: Dec. 15, 2015

(54) METHODS FOR SETTING THE ADDRESS OF A MODULE

(71) Applicant: Lexmark International, Inc., Lexington, KY (US)

(72) Inventor: Adam Ahne, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 14/517,324

(22) Filed: Oct. 17, 2014

(51) Int. Cl.
  *G06F 3/12* (2006.01)
  *G06K 15/00* (2006.01)
  *H04L 29/12* (2006.01)

(52) U.S. Cl.
  CPC .......... *G06K 15/407* (2013.01); *G06K 15/4095* (2013.01); *H04L 61/2038* (2013.01)

(58) Field of Classification Search
  CPC .................................................... G06K 15/407
  See application file for complete search history.

(56) References Cited

U.S. PATENT DOCUMENTS

| | | | |
|---|---|---|---|
| 5,210,846 | A | 5/1993 | Lee |
| 5,226,123 | A | 7/1993 | Vockenhuber |
| 5,270,972 | A | 12/1993 | Craig |
| 5,831,546 | A | 11/1998 | Costa |
| 6,255,973 | B1 | 7/2001 | Smith |
| 8,040,215 | B2 | 10/2011 | Zakriti |
| 8,576,591 | B2 | 11/2013 | Phadke |
| 8,793,418 | B2 | 7/2014 | Evans |

OTHER PUBLICATIONS

U.S. Appl. No. 14/517,394, filed Oct. 17, 2014, title "Systems for Setting the Address of a Module".

*Primary Examiner* — Dov Popovici (57) ABSTRACT

A method of operating a module is disclosed. The method includes adjusting an impedance between a power connection and a ground connection to regulate a power connection voltage targeted to a predetermined target voltage, and setting a module communication address based on the adjustment. The power connection voltage is a voltage on the power connection. Other methods are disclosed.

20 Claims, 10 Drawing Sheets

METHODS FOR SETTING THE ADDRESS OF A MODULE

CROSS REFERENCES TO RELATED APPLICATIONS

This application is related to U.S. patent application Ser. No. 14/517,394, filed Oct. 17, 2014, entitled "SYSTEMS FOR SETTING THE ADDRESS OF A MODULE".

BACKGROUND

1. Field of the Disclosure

The present disclosure relates generally to slave devices on a communication bus and more particularly to slave modules on an I2C bus.

2. Description of the Related Art

I2C (also known as I²C) is an inter-device communication standard. An I2C bus has one master device and one or more slave devices. Each slave device has a unique communication address so that the master device can direct communication to a particular slave device.

Printers have user-replaceable supply items such as toner bottles, These supply items may have authentication circuits to distinguish original equipment manufactured toner bottles from third-party toner bottles, since different operating procedures may apply. Authentication circuits may implement cryptography algorithms to increase confidence in the authentication. A single color printer, such as a mono printer, may have an authentication circuit on a toner bottle and another authentication circuit on an imaging unit. These modules that contain the authentication circuits may be nearly identical, the only difference being a non-volatile memory variable that contains the module address. During manufacturing, extra expense must be expended to keep track of these two similar, but non-identical, modules, and the system will not operate correctly if the modules are mixed up. What is needed is a way to use identical modules on multiple supply items.

SUMMARY

The invention, in one form thereof, is directed to a method of operating a module. The module has a power connection, a ground connection to which module voltages are referenced, and a serial communication connection. The method includes adjusting an impedance between the power connection and the ground connection to regulate a power connection voltage targeted to a predetermined target voltage, and setting a module communication address based on the adjustment.

The invention, in another form thereof, is directed to a method of operating a module that has a power connection and a ground connection. The method includes increasing current flowing into the module through the power connection to regulate a voltage between the power connection and the ground connection, and setting a module communication address based on the amount of current flowing into the module through the power connection.

The invention, in yet another form thereof, is directed to a method of operating a module. The module has a power connection, a ground connection, and a communication address. The method includes determining whether or not a voltage between the power connection and the ground connection is greater than a first predetermined threshold, and if so determined then decreasing an impedance between the power connection and the ground connection and setting the communication address to a first address. The method also includes determining whether or not the voltage between the power connection and the ground connection is less than a second predetermined threshold, and if so determined then increasing the impedance between the power connection and the ground connection and setting the communication address to a second address. The first address is not the same as the second address.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
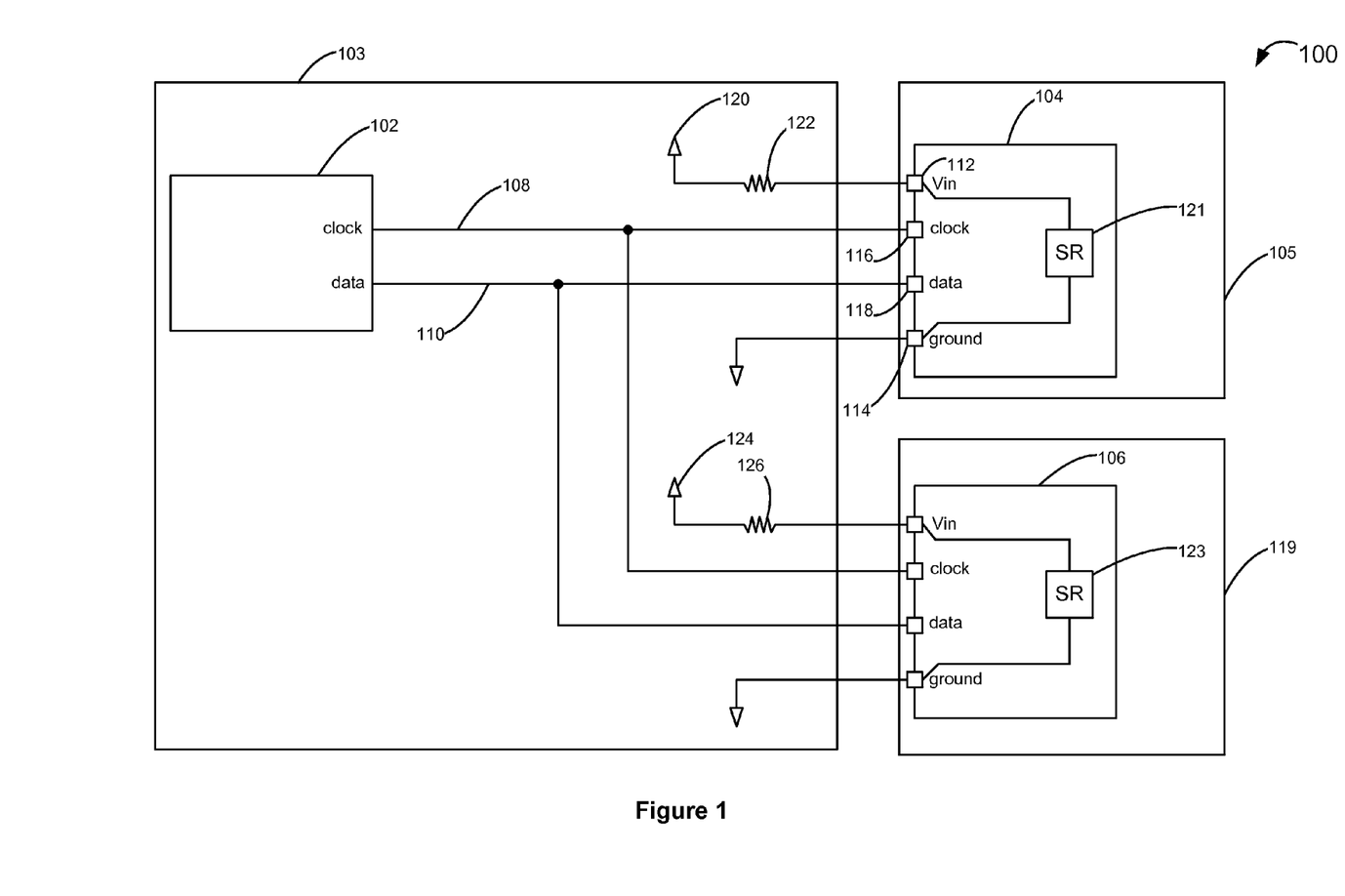
FIG. 1 is a schematic diagram depiction of a printer module network according to one embodiment of the present disclosure.

Referring now to the drawings and more particularly to FIG. 1, there is shown a schematic diagram depiction of a circuit according to one embodiment of the present disclosure. A printer module network 100 has a system application specific integrated circuit (ASIC) 102 coupled to a first module 104 and to a second module 106 via an I2C bus. The I2C bus has a clock line 108 driven by the system ASIC 102 and a data line 110 driven bi-directionally by the system ASIC 102, the first module 104, and the second module 106. The clock line and the data line are serial communication connections.

The system ASIC 102 is located on a system printed circuit board (PCB) 103. The first module 104 is located on a user-replaceable component, e.g., as shown a toner bottle 105. The first module 104 includes a PCB. A power connection 112, a ground connection 114, a clock connection 116, and a data connection 118 are, for example, conductive pads located on the first-module PCB. Compliant metal fingers touch the conductive pads forming electrical connections between the system PCB and the first module 104. Alternatively, power connection 112, ground connection 114, clock connection 116, and data connection 118 may he made with other reusable connections such as pin-in-socket connectors. The second module 106 has similar connections and is located on, for example, as shown an imaging unit 119.

The system ASIC 102 is an I2C master, the first module 104 and the second module 106 are I2C slaves. As is known in the art, a serial communication in the I2C data format contains a header that has a slave address. Each slave will only respond to communications that are addressed to its communication address. Thus, each slave on the I2C bus has a unique communication address.

The communication address of the first module 104 is not fixed. Instead, the communication address is controlled by a first power voltage 120 and a first source resistor 122 located on the system PCB. The voltage between the power connection 112 and the ground connection 114, hereafter referred to as Vin, is regulated by the first module 104 using a shunt regulator 121, e.g., a zener diode. The communication address of the first module 104 is based on the amount of current flowing into the power connection 112, hereafter referred to as Iin. Similarly, the communication address of the first module 104 may be based on, for example, an impedance between the power connection 112 and the ground connection 114, since this impedance will also influence Iin. Thus, when Vin is regulated to a voltage, Iin is controlled by the first power voltage 120 and the first source resistor 122.

A second power voltage 124 is coupled to the second module 106 via a second source resistor 126. The second module 106 has a shunt regulator 123 coupled to Vin and ground. If, for example, the first module 104 is identical to the second module 106, the first power voltage 120 is the same as the second power voltage 124, and the first source resistor 122 is the same as the second source resistor 126, then the first module 104 and the second module 106 will have the same communication address which is unwanted as it will cause bus conflicts. However, if the first source resistor 122 is not the same as the second source resistor 126, then the first module 104 and the second module 106 will not have the same communication address since they will have different input currents, hereafter referred to as Iin. For example, the first module 104 and the second module 106 are identical and will have a first communication address if Iin is greater than 40 mA and a second communication address if Iin is less than 40 mA. Of course, other combinations of source resistor and power voltage will result in different Iin and thus different communication addresses. For example, if the first power voltage 122 is 12V, the second power voltage 124 is 8V, the first source resistor 122 is 100 ohms, the second source resistor 126 is 65 ohms, and Vin is regulated to 6V, then the first-module Iin is 60 mA and the second-module Iin is 30 mA, and thus the communication address of the two modules will be different.

Note that the disclosed system has two identical modules on the same I2C bus but at different addresses, and this function is provided without adding additional connections. This allows the same module to be populated into multiple system components which simplifies manufacturing and lowers cost.

Note that other communication systems may be used instead of I2C. For example, a universal serial bus (USB) system also has slave devices with unique communication addresses. Instead of setting one of only two addresses, more addresses may be set by dividing Iin into more than two regions. For example, four addresses would be advantageous for toner bottles of a four color printer.

Figure 2:
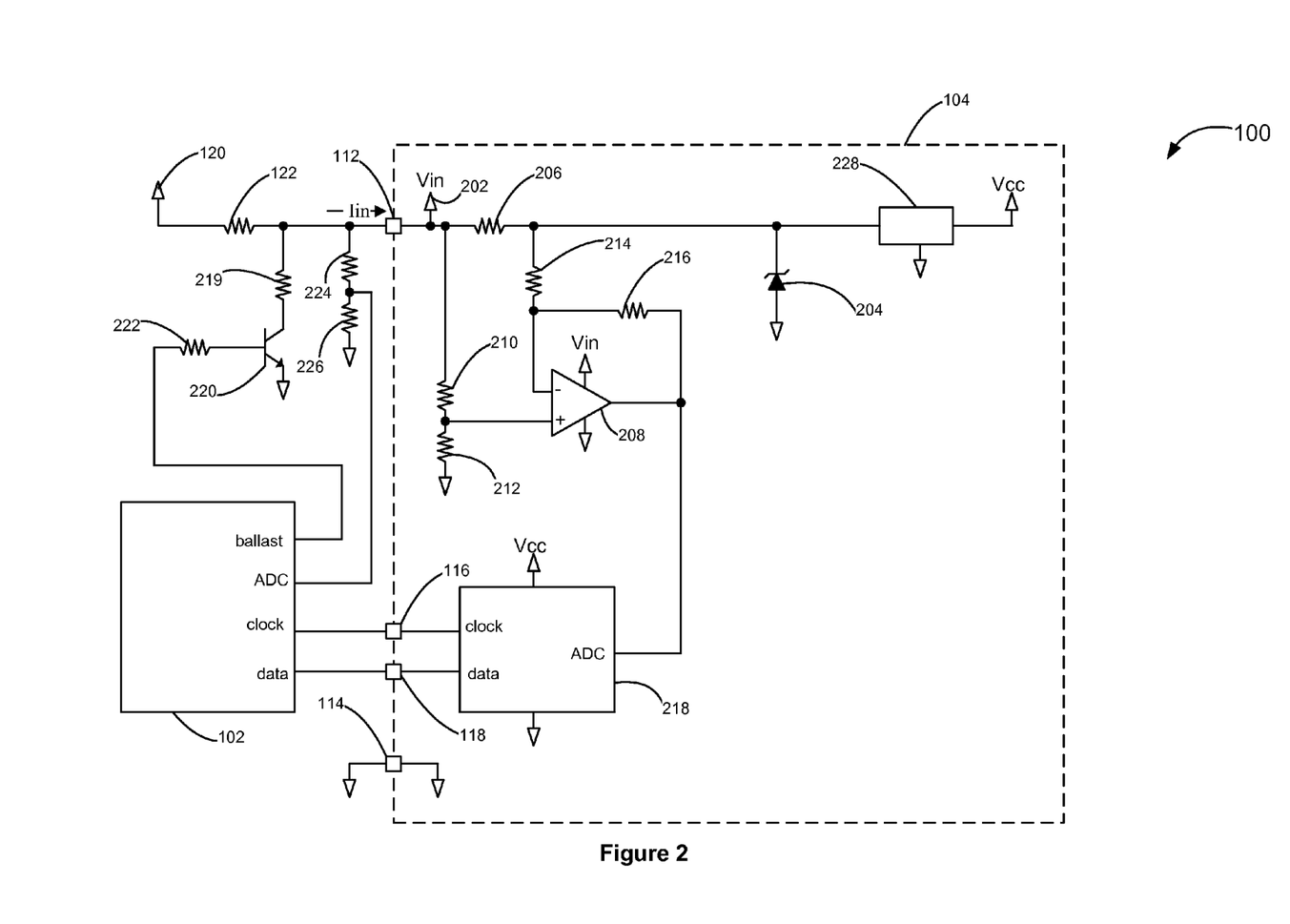
FIG. 2 is a schematic diagram depiction showing internal details of the printer module network.

FIG. 2 shows a schematic diagram depiction of the printer module network 100 showing internal details of the first module 104. Vin 202, downstream of power connection 112, is regulated by a zener diode 204 configured as a shunt regulator. The zener diode 204 is coupled to the power connection 112 via a sense resistor 206, which is sized so that it does not significantly degrade the ability of zener diode 204 to regulate Vin 202. Example component values are the Zener diode 204 is a 6V zener diode, sense resistor 206 is 1 ohm, and source resistor 122 is 100 ohms.

The voltage across sense resistor 206 is proportional to the amount of current flowing into the first module 104 through the power connection 112 i.e. Iin. A differential amplifier, made up of an op-amp 208 and resistors 210, 212, 214, 216, converts this differential voltage to a single-ended voltage referenced to ground. This single-ended voltage is coupled to an analog-to-digital converter (ADC) located in an authentication circuit 218. Authentication circuit 218 is a digital logic circuit and contains an I2C slave which is coupled to the system ASIC 102 via clock connection 116 and data connection 118. Note that the current through resistors 210, 212, 214, and 216 and the op-amp 208 is negligible compared to the current through sense resistor 206 and so does not add significant error to the measurement of Iin.

Authentication circuit 218 has a communication address because it is an I2C slave device. I2C communication addresses are either 7 bits or 10 bits in length. The most significant bits are set, for example, to a value stored in non-volatile memory located within the authentication circuit 218. The least significant bit is set based on the voltage read by the ADC, which is proportional to Iin. If Iin is greater than a predetermined input current threshold, for example, 40 mA, the least significant bit of the first-module communication address is set to one, otherwise it is set to zero. Thus, the first-module communication address may be changed by changing the value of the source resistor 122 since the source resistor 122 influences Iin. The authentication circuit 218 responds to communications addressed to the communication address.

The first-module communication address may also be changed by switching a ballast resistor 219 to ground. The ballast resistor 219 is, for example, 200 ohms. This will reduce the Thevenin equivalent voltage seen by the power connection 112 which will reduce Iin. The system ASIC 102 may switch in the ballast resistor 218 by turning on a transistor 220 via a resistor 222. In this way, the system ASIC 102 may dynamically change the first-module communication address to verify, for example, that the first module 104 is operating correctly.

The system ASIC 102 may verify that the first module 104 is regulating Vin by reading an ADC coupled to Vin via resistor 224 and resistor 226. The authentication circuit 218 may behave erratically if its power voltage droops, which may happen if the zener diode 204 fails to regulate Vin. Authentication circuit Vcc is supplied by a linear regulator 228. Alternatively, the authentication circuit 218 may be supplied by Vin and the linear regulator may be omitted.

Figure 3:
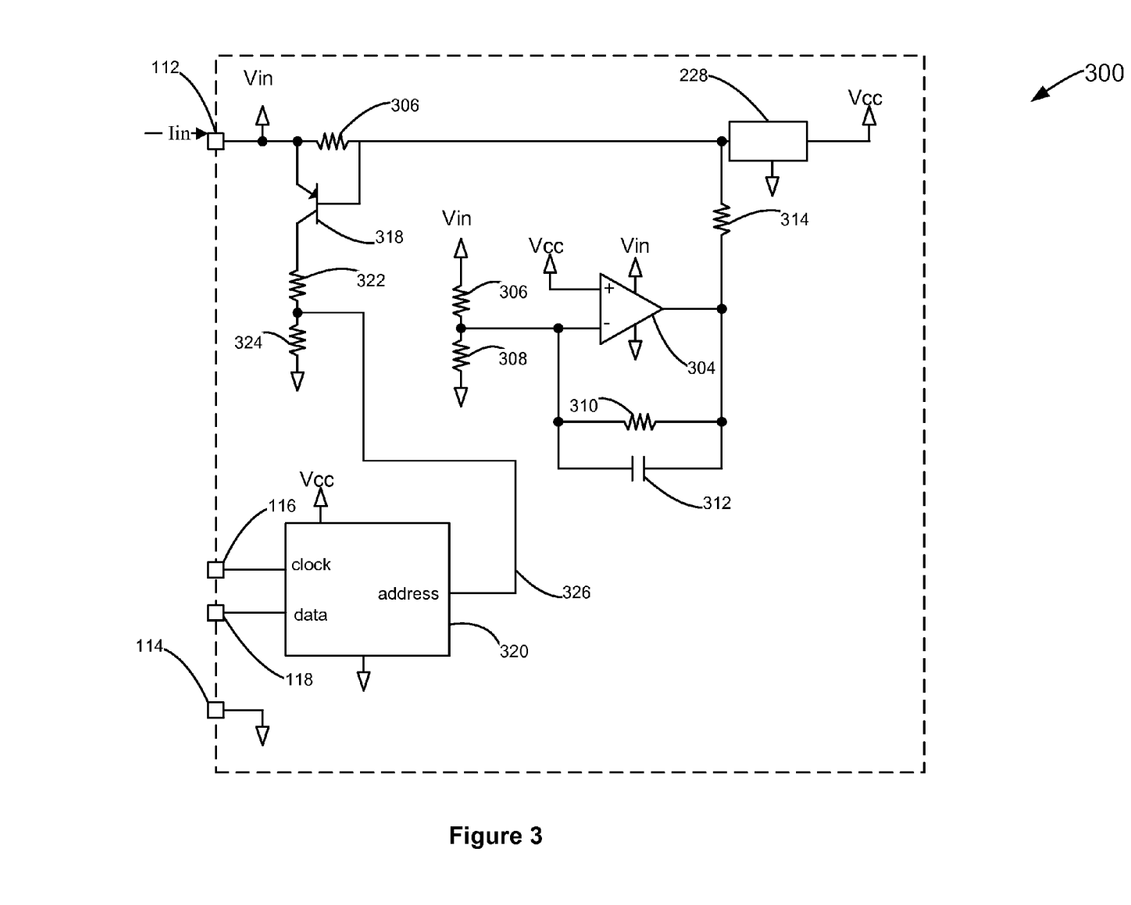
FIGS. 3-7 are schematic diagram depictions of alternate embodiments of the printer module network

FIG. 3 shows a schematic diagram depiction of a module 300 according to another embodiment of the present disclosure. The module 300 has the same electrical interface as the first module 104. An op-amp 304, and associated components 306-314, forms an active current sink configured as a shunt regulator which regulates Vin to a predetermined target voltage e.g. 6V. A sense resistor 316 activates a transistor 318 when Iin exceeds a predetermined threshold Ith, e.g., 40 mA. Transistor 318 is coupled to a digital circuit 320 via a voltage divider made of resistor 322 and resistor 324. The digital circuit 320 is, for example, a non-volatile memory, e.g., EEPROM, flash, etc. The digital circuit 320 is an I2C slave, and its communication address is based on the state of the address line 326. The communication address will be a first address when Iin is below Ith and will be a second address when tin is above Ith.

Figure 4:
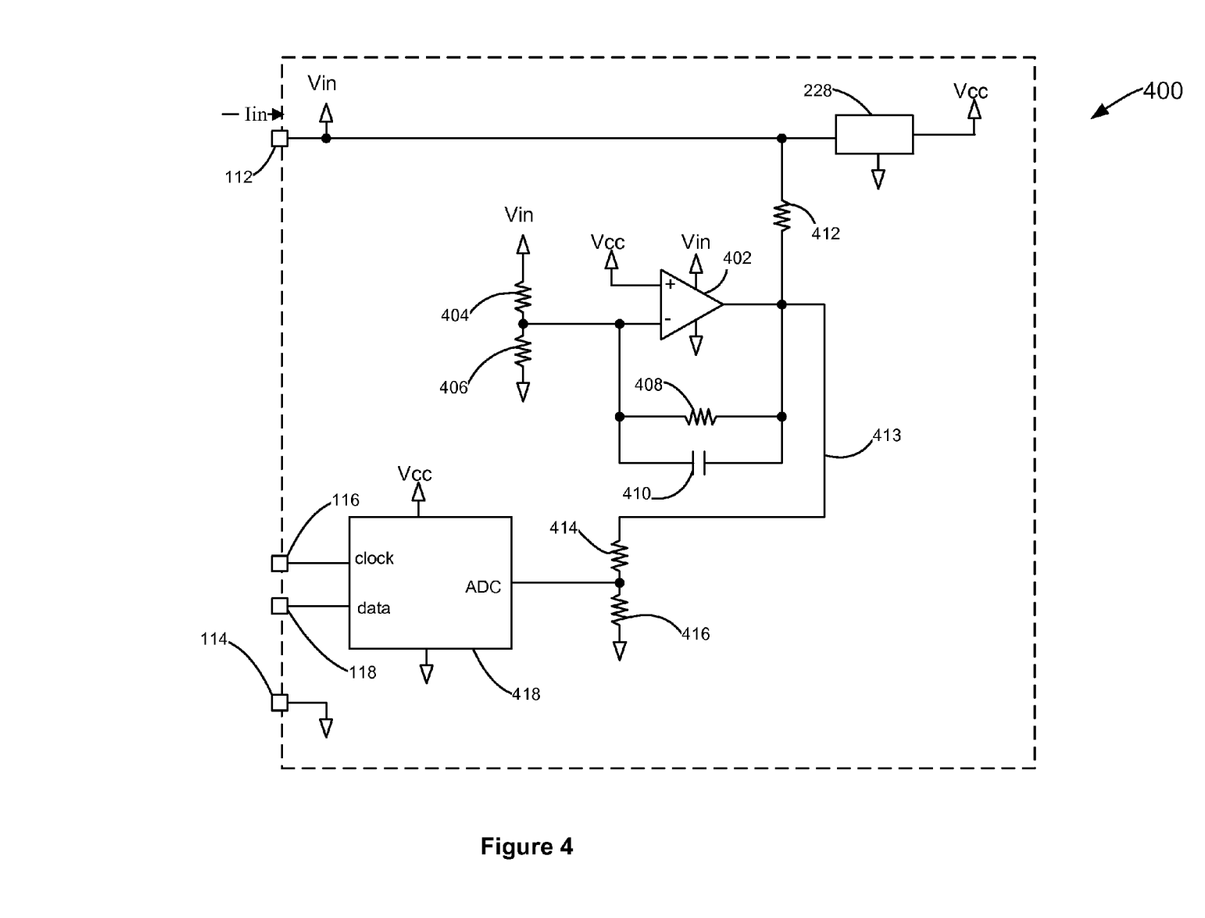

FIG. 4 shows a schematic diagram depiction of a module 400 according to another embodiment of the present disclosure. The module 400 has the same electrical interface as the first module 104. An op-amp 402, and associated components 404-412, forms an adjustable current sink configured as a shunt regulator which regulates Vin to a predetermined target voltage e.g. 6V. The output of the op-amp 402 is a control line 413 that adjusts the current in the adjustable current sink since the current through resistor 412 is inversely proportional to the voltage at the control line 413. The module 400 does not to measure Iin directly. Instead, the control line 413 is coupled via resistor 414 and resistor 416 to an ADC in an authentication ASIC 418. The authentication ASIC 418 is a digital circuit that contains an authentication circuit.

Assuming that the current into the linear regulator 228, op-amp 402, and components 404-410 is negligible, Iin is proportional to the current through resistor 412 which is inversely proportional to the voltage on control line 413 hereinafter referred to as Vcl. The authentication ASIC 418 reads Vcl and sets a communication address based on this voltage. For example, the communication address may be set to a first address when Vcl exceeds a predetermined threshold and may otherwise be set to a second address. Of course, more communication addresses are possible with multiple thresholds. The authentication ASIC 418 responds to communications addressed to the communication address.

The authentication ASIC 418 may synchronize setting the communication address to when the authentication circuit is in a low-power state, such as, for example, when the authentication circuit is in an idle state. This will reduce the current into the linear regulator 228 so that it is negligible.

Figure 5:
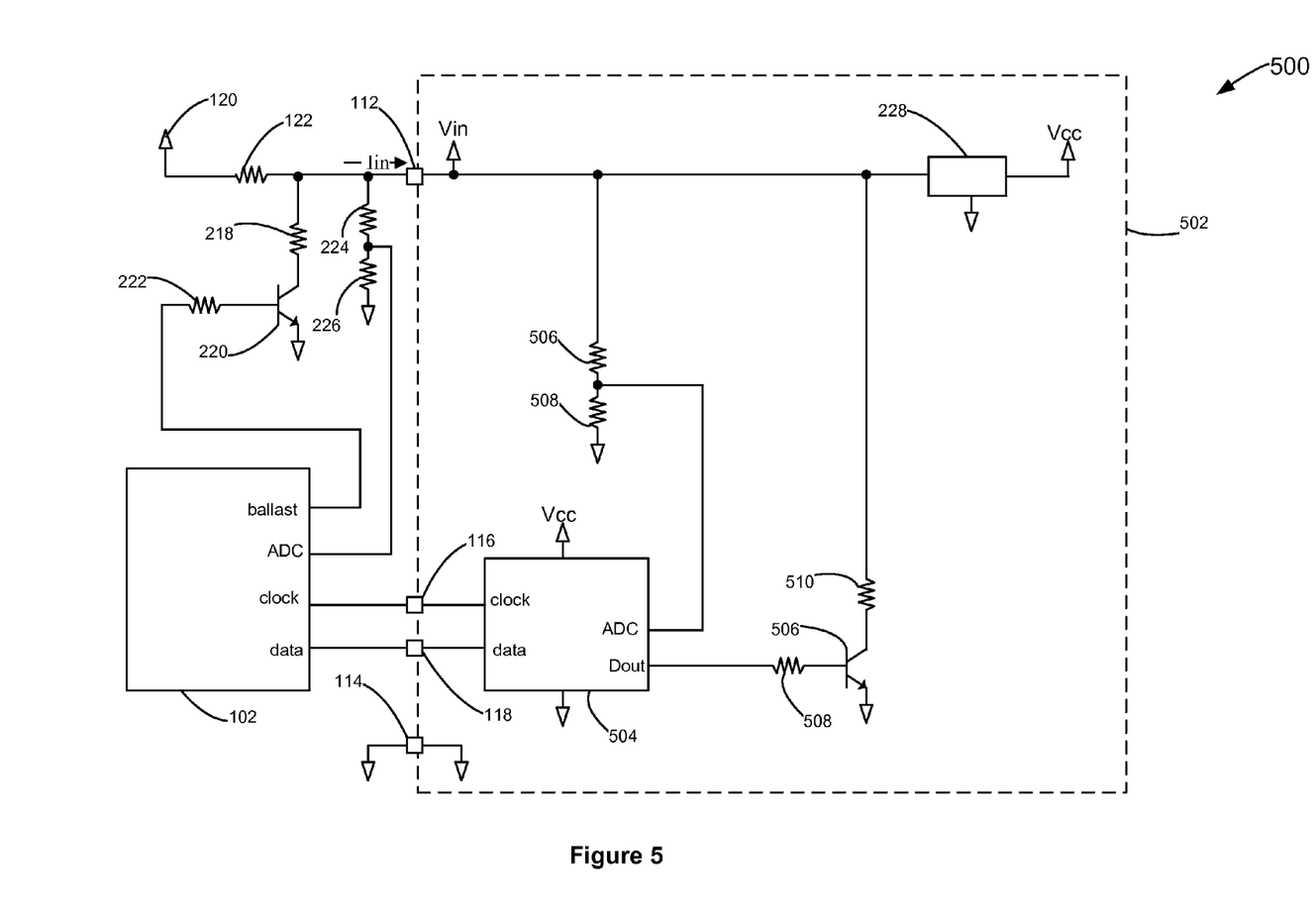

FIG. 5 shows a schematic diagram depiction of a printer module network 500. A module 502 is coupled to the system ASIC 102. The module 502 has the same electrical interface as the first module 104. Vin is coupled to an ADC input of a digital circuit 504 though resistor 506 and resistor 508. A digital output of the digital circuit 504 is coupled to a transistor 506 via a resistor 508. The transistor 506 is coupled to a resistor 510 that is coupled to Vin.

The digital circuit 504 is an I2C slave device that has a communication address. The digital circuit 504 has a controller that controls Dout and sets the communication address based on the voltage at the ADC input, which is proportional to Vin. If Vin is greater than a first predetermined threshold, the controller turns on Dout which decreases the impedance between a power connection 514 and a ground connection 516 and sets the communication address to a first address. If Vin is less than a second predetermined threshold, the controller turns off Dout which increases the impedance between the power connection 514 and the ground connection 516 and sets the communication address to a second address. If neither of these conditions are true then the controller does not change the to state of Dout and does not change the communication address. The first address is not the same as the second address. The least significant bit of the communication address may be the same as Dout, and the most significant bits may be retrieved from NVRAM located in the digital circuit 504. The controller responds to communications addressed to the communication address.

For example, if the first power voltage 120 is 12V, the first source resistor 122 is 100 ohms, resistor 218 is 200 ohms, resistor 224 is 40 k ohms, resistor 226 is 10 kohms, resistor 506 is 40 k ohms, resistor 508 is 10 k ohms, resistor 510 is 200 ohms, and the current into the linear regulator 228 is negligible, and if the ballast output of the system ASIC 102 is low and Dout of the digital circuit is low, then Vin=12V. Assuming that the first predetermined threshold is 8.5V, the controller will determine that Vin is too high and will drive Dout high which will bring Vin down to 8V. Later, if the system ASIC 102 drives ballast high, Vin will drop to 6V. Assuming that the second predetermined threshold is 7.5V, the controller will determine that Vin is too low and will drive Dout low which will make Vin 8V. In this way, the module 502 regulates Vin.

In this example embodiment, the first predetermined threshold is greater than the second predetermined threshold. This gives the system some hysteresis which makes the module more resistant to noise on Vin. Alternatively, the first predetermined threshold may be the same as the second predetermined threshold which may be cheaper to implement if, for example, the ADC is replaced by a comparator.

Note that, in this example embodiment, the I2C slave device and the controller are integrated into the digital circuit which is an ASIC. Alternatively, the I2C slave device and the controller may be separate devices. The I2C slave device may include an authentication circuit.

Figure 6:
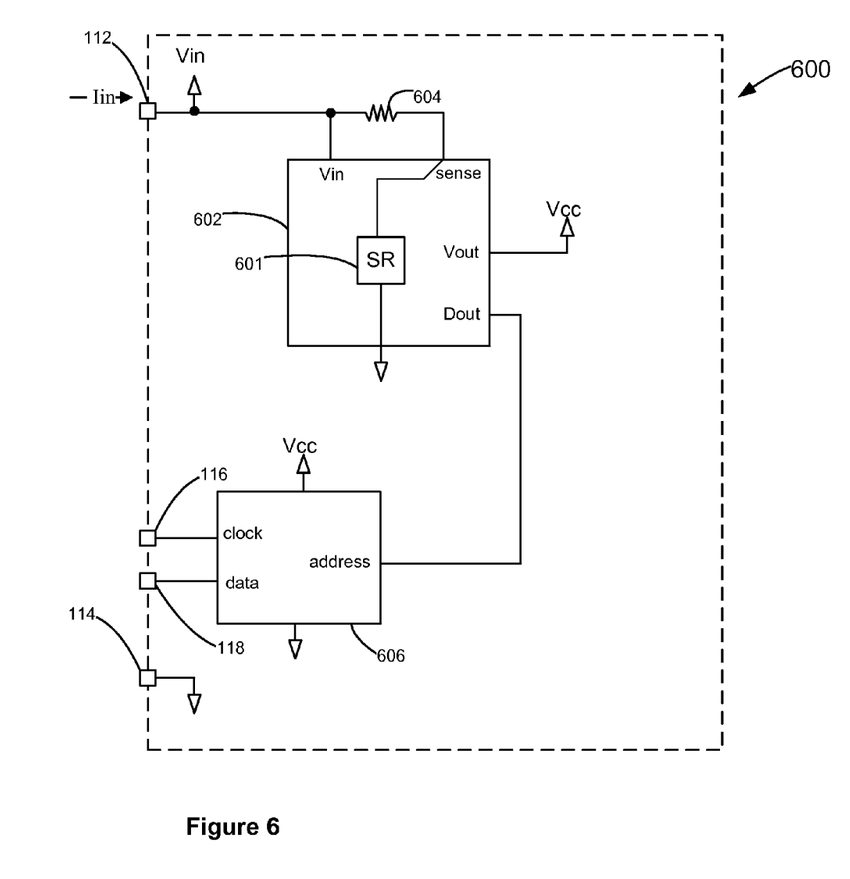

FIG. 6 shows a schematic diagram depiction of a module 600 according to another embodiment of the present disclosure. The module 600 has the same electrical interface as the first module 104. A shunt regulator 601 in ASIC 602 regulates Vin to a predetermined target voltage by adjusting an active current sink located within the shunt regulator 601. The ASIC 602 also has a current measuring circuit that measures the voltage across a resistor 604. The current sunk by shunt regulator 601 passes through the resistor 604. The ASIC 602 has a comparator that drives a digital output Dout based on the output of the current measuring circuit. The digital output Dout is coupled to an address input of a digital logic circuit 606 which is an I2C slave device. A communication address of the digital logic circuit 606 is based on the state of the address input. The digital logic circuit may include an authentication circuit. The module is configured to perform one or more of the methods disclosed below.

Figure 7:
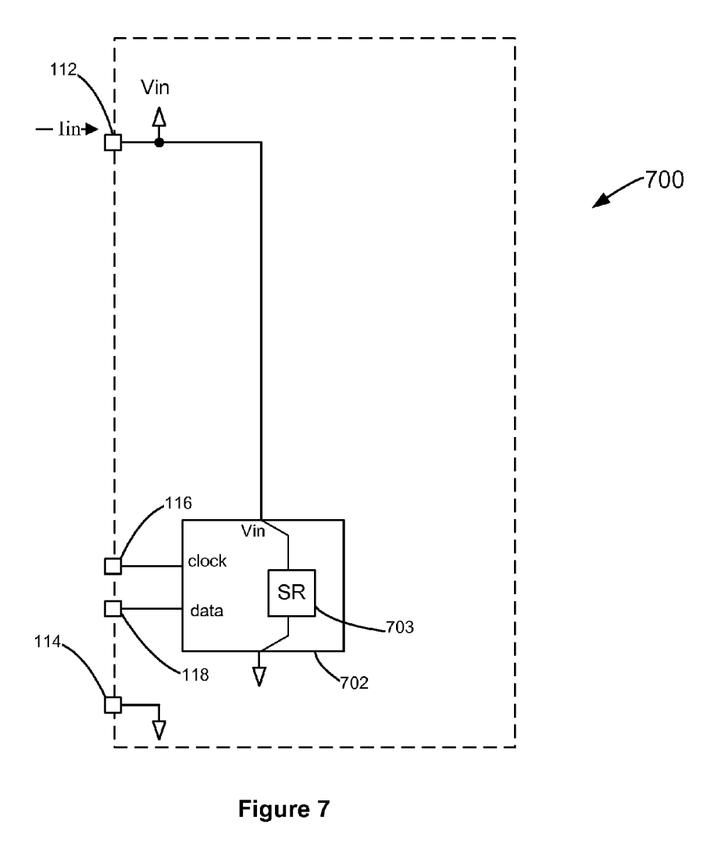

FIG. 7 shows a schematic diagram depiction of a module 700 according to another embodiment of the present disclosure. The module 700 has the same electrical interface as the first module 104. An authentication ASIC 702 has a shunt regulator 703 that regulates Vin to a predetermined target voltage by adjusting an adjustable current sink located within shunt regulator 703. Shunt regulator 703 has a control line that adjusts the current sunk by the adjustable current sink. The authentication ASIC 702 is an I2C slave device with a communication address. The communication address is based on the state of the control line. Alternatively, the authentication ASIC 702 may have a current measuring circuit that measures Iin and the communication address is based on the current measured. The module is configured to perform one or more of the methods disclosed below.

Figure 8:
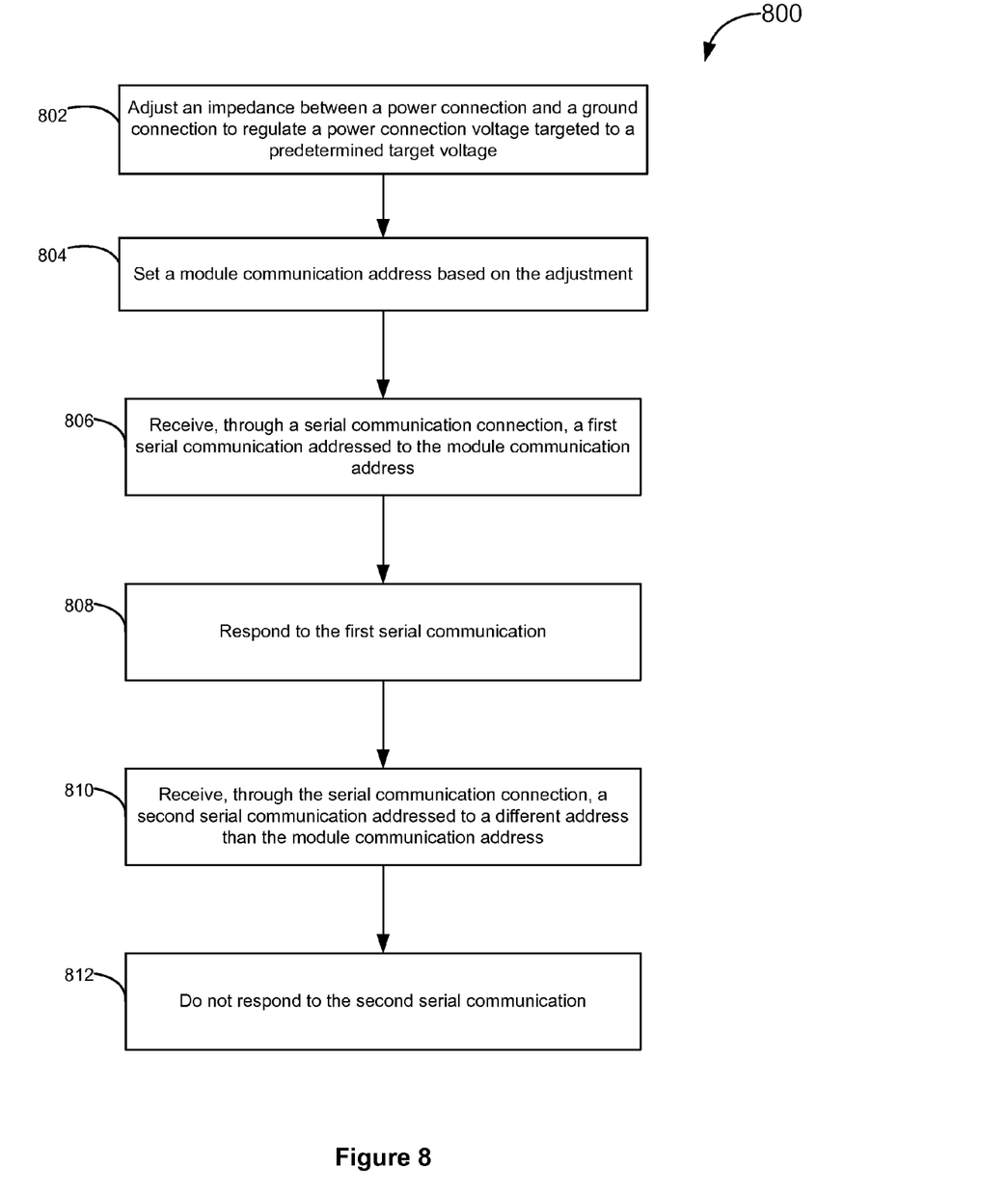
FIGS. 8-10 are flowcharts of methods of operating a module according to embodiments of the present disclosure.

FIG. 8 shows art example embodiment of a method of operating a module according to one embodiment. Method 800 sets a module communication address based on an adjustment in impedance made to regulate a power connection voltage, which is influenced by the source voltage and source impedance supplied to the module. This enables identical modules to be coupled to the same communication bus at different addresses. The module has a power connection, a ground connection, a clock connection, and a data connection. The clock connection and the data connection are serial communication connections e.g. I2C.

At block 802, an impedance between the power connection and the ground connection is adjusted to regulate a power connection voltage targeted to a predetermined target voltage. For example, the power connection voltage may be regulated to 6V. The regulation may have a tolerance, for example +/− 10% of the target voltage, depending on component tolerances and load variations.

At block 804, a module communication address is set based on the adjustment made at block 802. For example, if the adjusting included switching on a transistor connected to a ballast resistor to maintain regulation then the module communication address is set to a first address. Otherwise, the module communication address is set to a second to address. Of course, more than two addresses may be used if the system has the capability to make finer adjustments of the impedance between the power connection and the ground connection.

At block 806, through a serial communication connection, a first serial communication addressed to the module communication address is received. The serial communication connection may be, for example, the data connection. At block 808, the first serial communication is responded to since it was addressed to the module communication address. For example, an I2C serial communication may be a header containing a start condition, a read command, and a I2C slave address, formatted in the I2C data format. The response may be made by driving data on the data connection.

At block 810, through the serial communication connection, a second serial communication is received addressed to a different address than the module communication address. At block 812, do not respond to the second serial communication since it was not addressed to the module communication address.

The method 800 may repeat adjusting the impedance and setting the module communication address in response to changes in the source voltage or the source impedance. Thus, the module communication address may be changed dynamically to avoid a conflict if, for example, a new module is added to the I2C bus.

The module may contain an authentication circuit used to verify the origin of the module. The authentication circuit may require a large amount of input current while it is performing an authentication. The method 800 may synchronize setting the module communication address to when the authentication circuit is in a lower-power state, such as an idle state, so that the current demands of the authentication circuit does not disturb the regulation of the power connection voltage. Other lower-power states may include, for example, memory reads, memory writes, etc.

Figure 9:
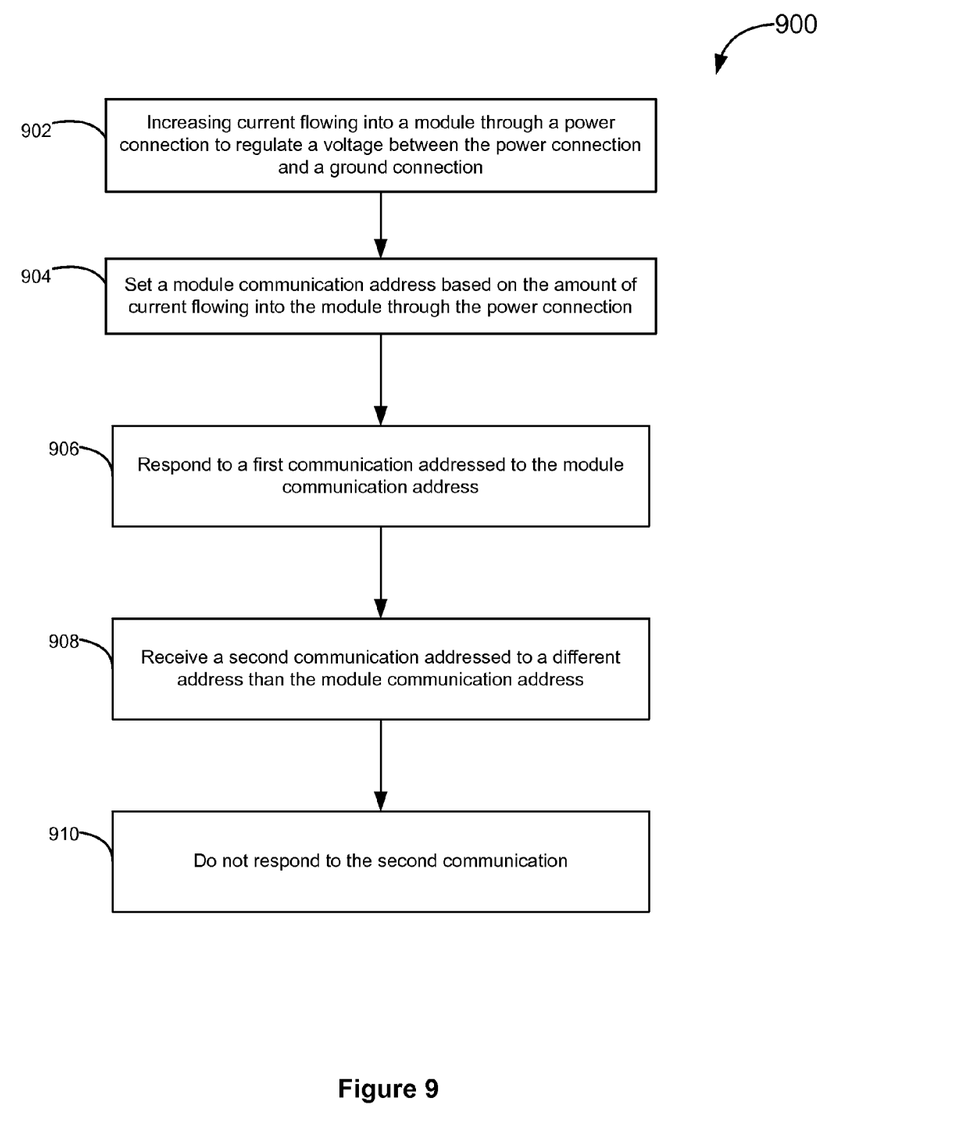

FIG. 9 shows an example embodiment of a method 900 of operating a module according to one embodiment. The module has a power connection, a ground connection, and a module communication address, At block 902, current flowing into the module through the power connection increased to regulate a voltage between the power connection and the ground connection. At block 904, the module communication address is set based on the amount of current flowing into the module through the power connection. The communication address may be set to one of two addresses. Alternatively, the communication address may be set to one of three or more addresses. At block 906, a first communication addressed to the module communication address is responded to. The first communication may be formatted in the I2C data format.

At block 908, a second communication addressed to a different address than the module communication address is received. At block 910, do not respond to the second communication since it was not addressed to the module communication address.

The module may have an authentication circuit. The method 900 may synchronize setting the module communication address to when the authentication circuit is in a lower-power state, such as an idle state.

Figure 10:
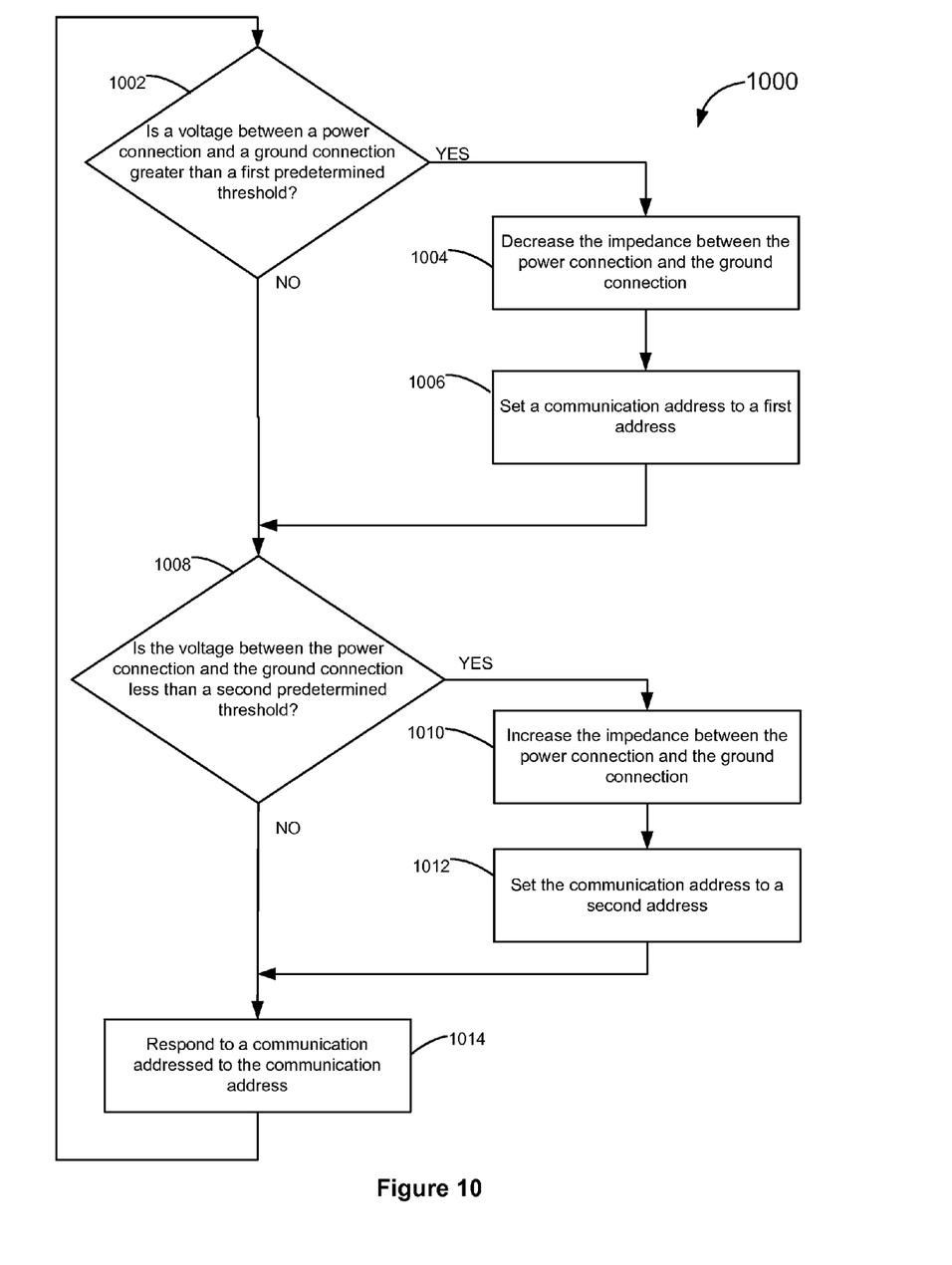

FIG. 10 shows an example embodiment of a method 1000 of operating a module according to one embodiment. The module has a power connection, a ground connection, and a communication address.

At block 1002, determine whether or not a voltage between the power connection and the ground connection is greater than a first predetermined threshold. If so determined, then at block 1004 decrease an impedance between the power connection and the ground connection, and at block 1006 set the communication address to a first address.

At block 1008, determine whether or not the voltage between the power connection and the ground connection is less than a second predetermined threshold. If so determined, then at block 1010 increase the impedance between the power connection and the ground connection, and at block 1012 set the communication address to a second address. The first address is not the same as the second address. The first predetermined threshold may be greater than the second predetermined threshold to provide hysteresis. Alternatively, the first predetermined threshold may be the same as the second predetermined threshold to simplify the determining act.

At block 1014, respond to a communication addressed to the communication address. The communication may be, for example, in the I2C data format.

In the disclosed embodiments, an ADC may be replaced by a comparator or a group of comparators. The acts of a method may be performed by a single controller. Alternatively, a plurality of circuits may perform one or more acts of a method. The acts of the methods may be performed in different orders than the given examples.

The foregoing description illustrates various aspects and examples of the present disclosure. it is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

What is claimed is:

1. A method of operating a module, the module having a power connection, a ground connection to which module voltages are referenced, and a serial communication connection, the method comprising:
    adjusting an impedance between the power connection and the ground connection to regulate a power connection voltage targeted to a predetermined target voltage; and
    setting a module communication address based on the adjustment,
    wherein the power connection voltage is a voltage regulated on the power connection.

2. The method of claim 1, further comprising:
    receiving, through The serial communication connection, a first serial communication addressed to the module communication address; and
    responding to the first serial communication.

3. The method of claim 2, wherein the first serial communication is an I2C communication.

4. The method of claim 2, further comprising:
    receiving, through the serial communication connection, as second serial communication addressed to a different address than the module communication address; and
    not responding to the second serial communication.

5. The method of claim 1, wherein setting the module communication address based on the adjustment is limited to one or two addresses.

6. The method of claim 1, wherein setting the module communication address is synchronized to when an authentication circuit is in a low-power state.

7. The method of claim 1, wherein setting the module communication address is synchronized to when an authentication circuit is in an idle state.

8. The method of claim 1, further comprising repeating the adjusting and the setting.

9. A method of operating a module, the module having a power connection and a ground connection, the method comprising:
regulating a voltage between the power connection and the ground connection by increasing current flowing into the module through the power connection;
measuring the current flowing into the module through the power connection; and
setting a module communication address based on the measured current.

10. The method of claim 9, further comprising responding to a first communication addressed to the module communication address.

11. The method of claim 10, wherein the first communication is an I2C communication.

12. The method of claim 10, further comprising:
receiving a second communication addressed to a different address than the module communication address; and
not responding to the second communication.

13. The method of claim 9, wherein setting the module communication address is limited to one of two addresses.

14. The method of claim 9, wherein setting the module communication address is synchronized to when an authentication circuit is in a low-power state.

15. The method of claim 9, wherein setting the module communication address is synchronized to when an authentication circuit is in an idle state.

16. A method of operating a module, the module having a power connection, a ground connection, and a communication address, the method comprising:
determining whether or not a voltage between the power connection and the ground connection is greater than a first predetermined threshold, and if so determined then decreasing an impedance between the power connection and the ground connection and setting the communication address to a first address; and
determining whether or not the voltage between the power connection and the ground connection is less than a second predetermined threshold, and if so determined then increasing the impedance between the power connection and the ground connection and setting the communication address to a second address,
wherein the first address is not the same as the second address.

17. The method of claim 16, wherein the first predetermined threshold is the swine as the second predetermined threshold.

18. The method of claim 16, wherein the first predetermined threshold is greater than the second predetermined threshold.

19. The method of claim 16, further comprising responding to a communication addressed to the communication address.

20. The method of claim 19, wherein the communication addressed to the communication address is an I2C communication.

* * * * *